(12) United States Patent
Biggs

(10) Patent No.: US 6,882,663 B2
(45) Date of Patent: Apr. 19, 2005

(54) METHOD FOR SYNCHRONIZING A CONTROL CHANNEL TO A WORKING CHANNEL

(75) Inventor: Robert A. Biggs, Evanston, IL (US)

(73) Assignee: Motorola, Inc., Schaumburg, IL (US)

( * ) Notice: Subject to any disclaimer, the term of this patent is extended or adjusted under 35 U.S.C. 154(b) by 64 days.

(21) Appl. No.: 10/403,852

(22) Filed: Mar. 31, 2003

(65) Prior Publication Data

US 2004/0190487 A1 Sep. 30, 2004

(51) Int. Cl.[7] .................................. H04J 3/06
(52) U.S. Cl. ................. 370/509; 370/503; 370/515; 370/436
(58) Field of Search ................. 375/365, 367, 375/354; 370/503, 509, 510, 515, 491, 436, 330, 350, 500

(56) References Cited

U.S. PATENT DOCUMENTS

| | | | | |
|---|---|---|---|---|
| 3,798,378 A | * | 3/1974 | Epstein | ........................ 370/510 |
| 5,125,102 A | * | 6/1992 | Childress et al. | .............. 455/9 |
| 5,502,767 A | * | 3/1996 | Sasuta et al. | ................ 380/274 |
| 5,568,511 A | * | 10/1996 | Lampe | ........................ 370/341 |
| 5,594,761 A | * | 1/1997 | Brown | ........................ 370/356 |
| 5,790,527 A | | 8/1998 | Janky | |
| 5,864,762 A | * | 1/1999 | Childress et al. | ............ 455/509 |
| 5,956,648 A | * | 9/1999 | Brennan et al. | ............ 455/518 |
| 6,014,375 A | | 1/2000 | Janky | |
| 6,449,291 B1 | * | 9/2002 | Burns et al. | ................ 370/516 |

* cited by examiner

*Primary Examiner*—Wellington Chin
*Assistant Examiner*—Mark Mais
(74) *Attorney, Agent, or Firm*—Terri S. Hughes; Indira Saladi

(57) ABSTRACT

A subscriber unit (104) listens to a first channel (202) comprising a plurality of micro-slots and a plurality of data units. The subscriber unit decodes at least a portion of a data unit on the first channel comprising a micro-slot value. The subscriber unit learns the synchronization between the first channel and a second channel (206/300) based on the micro-slot value. A first base radio ($106_1$) transmits a first plurality of data units on the first channel. A second base radio ($106_3$) transmits a second plurality of data units on the second channel. The first plurality of micro-slots on the first channel are synchronized with the second plurality of micro-slots or plurality of frame boundaries on the second channel. The first base radio transmits a message (406) on the first channel in at least one of the plurality of data units, wherein the message comprises at least a micro-slot value used to associate the synchronization between the first channel and the second channel.

21 Claims, 7 Drawing Sheets

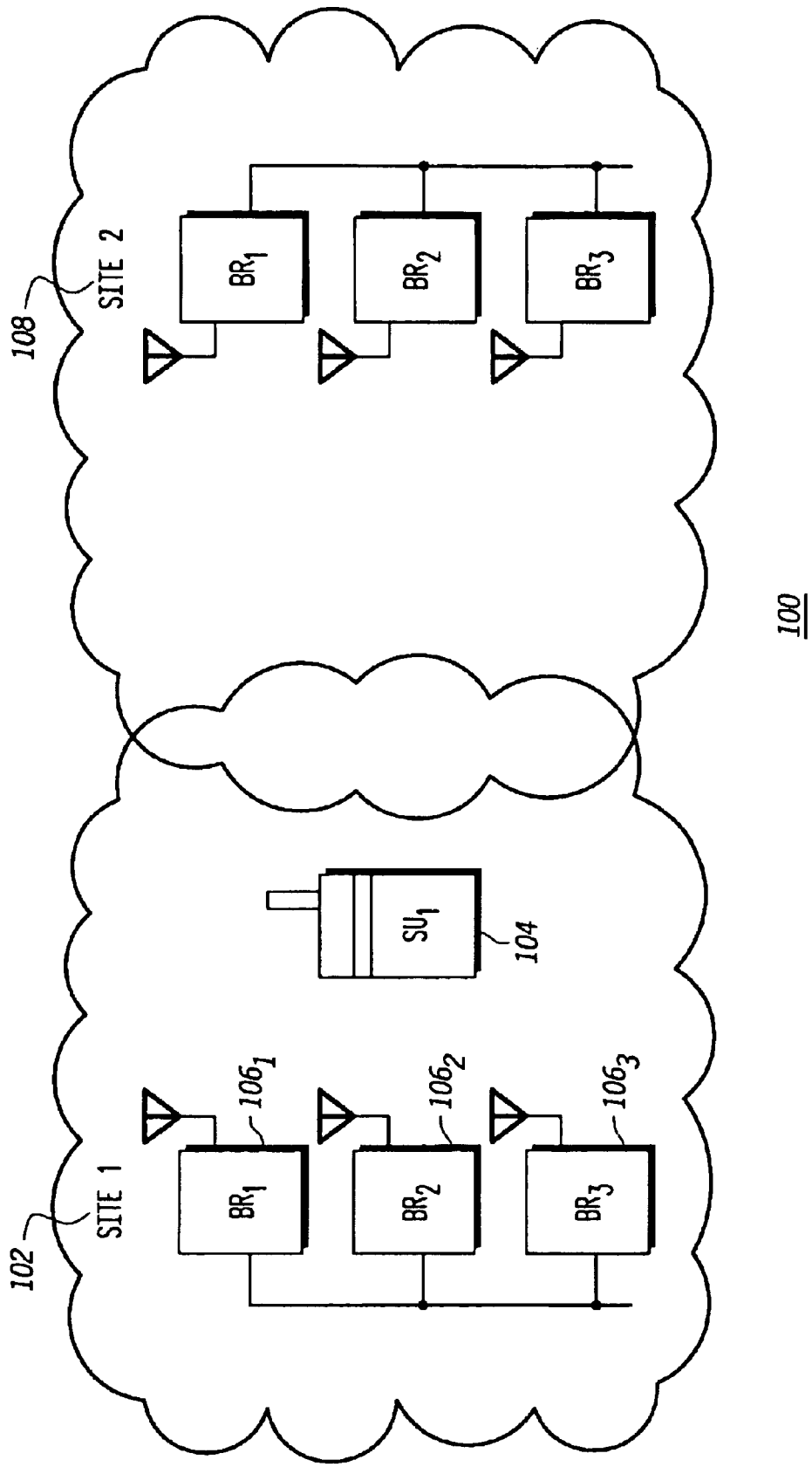
*FIG. 1* –PRIOR ART–

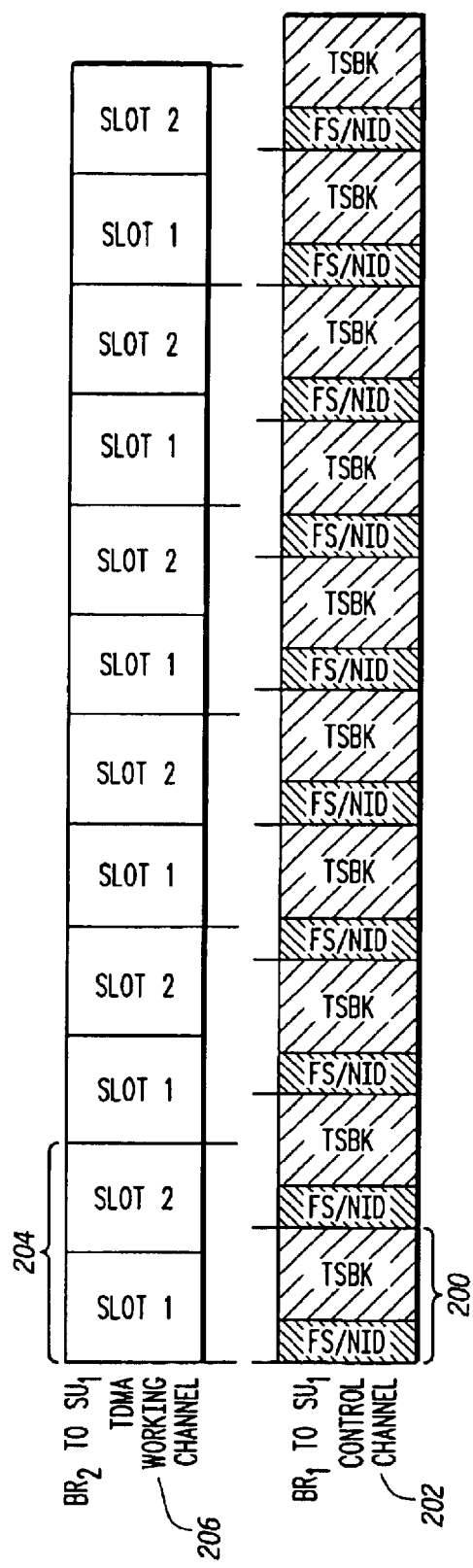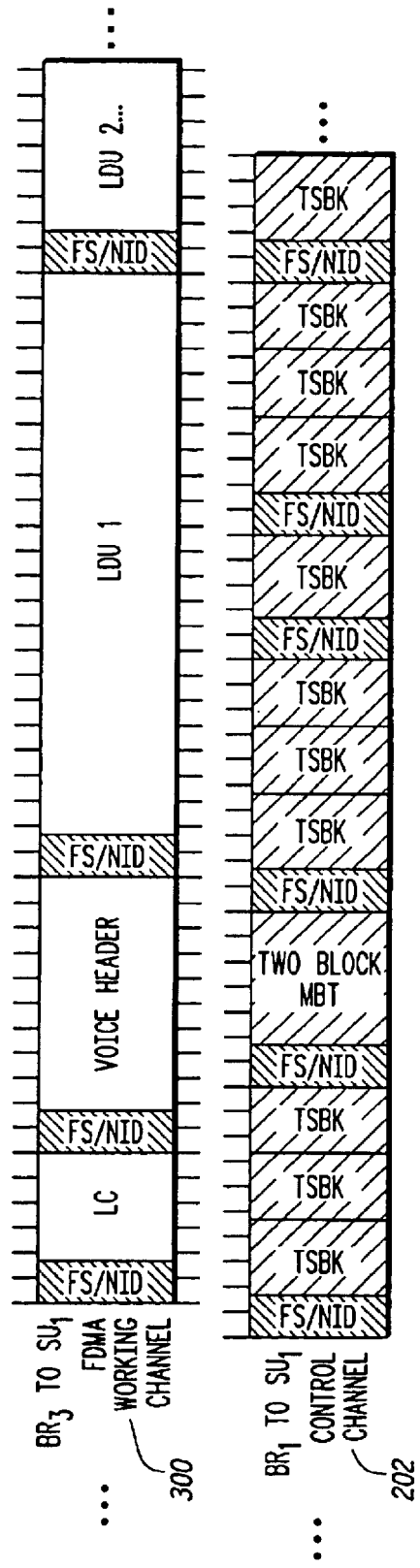
FIG.2 —PRIOR ART—
FIG.3 —PRIOR ART—

METHOD FOR SYNCHRONIZING A CONTROL CHANNEL TO A WORKING CHANNEL

FIELD OF THE INVENTION

The present invention relates generally to a method for synchronizing a control channel to a working channel, particularly a time division multiple access working channel and/or a frequency division multiple access working channel.

BACKGROUND OF THE INVENTION

Many radio frequency ("RF") communication systems will utilize a control channel to assign subscriber units to working channels. These systems may make use of time division multiple access ("TDMA") and frequency division multiple access ("FDMA") technologies, sometimes mixing both within a single system.

Today, it is desired to have a single control channel assign a subscriber unit to either a TDMA working channel and/or a FDMA working channel, while minimizing access time to operate on the working channel. FIG. 1 illustrates a system diagram of a typical communication system 100. The communication system 100 comprises at least one site 102 and at least one subscriber unit 104. In the example illustrated in FIG. 1, the site 102 comprises a plurality of base radios $106_1$, $106_2$, and $106_3$. In this example, a first base radio 106, provides a control channel service, a second base radio $106_2$ provides a TDMA working channel service, and a third base radio $106_3$ provides a FDMA working channel service. The subscriber unit 104 may communicate with any single base radio 106 depending on its desired service. It should be noted that while FIG. 1 depicts only two sites, one subscriber unit, and three base radios, a practical system may include additional sites, subscriber units and base radios.

Synchronization between the control channel and the working channel is required in order to transmit and receive information on the working channel. In the case of the TDMA working channel, a subscriber unit 104 must learn the TDMA frame/slot boundaries to avoid overlapping transmissions.

One approach that utilizes learning the synchronization solely from the working channel faces challenges: increased access time and/or audio delay for initial transmissions. Consider a subscriber unit 104 that has been granted to transmit in one slot of a given frequency. That subscriber unit 104 must first tune to the transmit frequency of the working channel and wait for the frame synchronization pattern. Similar to FDMA channels, the frame synchronization pattern may be transmitted only once every 180 ms per slot during voice transmissions. The subscriber unit 104 can use the frame synchronization pattern located in slot one, slot two, etc. regardless of the designated slot to gain the ability to decode symbols on the outbound channel.

Acquiring outbound bit synchronization, however, is not adequate to discover the slot number. In order to discover which slot is slot one, slot two, etc., the subscriber unit 104 must decode at least one slot's worth of information. Decoding at least one slot's worth of information may impair the subscriber unit 104 from being ready to transmit in the next useable inbound slot.

Previous systems either use a TDMA control channel to assign a subscriber unit 104 to a TDMA working channel and use a FDMA control channel to assign a subscriber unit 104 to a FDMA working channel, or attempt to synchronize FDMA data units to TDMA frame boundaries to assign a subscriber unit 104 to a TDMA working channel 206, as described by U.S. Pat. No. 6,014,375 of Janky issued Jan. 11, 2000, titled "TDMA Radio Protocol with Adaptive Vocoder Selection" (hereinafter referred to as the '375 patent).

As illustrated in FIG. 2, and as described in the '375 patent, every eight data units 200 in a control channel 202 is synchronized in time to every five TDMA frames 204 in the working channel 206. One disadvantage, however, to the '375 patent is that the data units 200 on the control channel 202 must be of a fixed length in order for the control channel 202 to assign a subscriber unit 104 to the working channel 206; thus, the '375 patent does not account for synchronizing a control channel 202 having variable length data units 200 with a TDMA working channel 206.

Additionally, it is also desired to have air interface encryption synchronization between the control channel 202 and the working channel. The current state of the art systems utilize a message transmitted periodically on a control channel 202 to provide encryption synchronization for the same control channel 202 as described by U.S. Pat. No. 5,502,767 of Sasuta et al. issued Mar. 26, 1996, titled "Method for Maintaining Secure Information Synchronization on a Control Channel" (hereinafter referred to as the '767 patent). A disadvantage to the '767 patent is that separate encryption synchronization is required for both the control channel 202 and the working channel 206, which introduces an additional delay into the system when the subscriber unit 104 switches between the control channel 202 and the working channel 206.

Further, FIG. 3 illustrates a typical configuration where the control channel 202 is asynchronous to a FDMA working channel 300. The asynchronous nature between the channels makes it more difficult to obtain encryption synchronization between the control channel 202 and the working channel 206/300 when the subscriber unit 104 switches between the control channel 202 and the working channel 206/300.

Thus, there exists a need for a single control channel 202 to assign a subscriber unit 104 to both a TDMA and/or a FDMA working channel, while minimizing access time to operate on the working channel and while providing an air interface encrypted service.

BRIEF DESCRIPTION OF THE FIGURES

A preferred embodiment of the invention is now described, by way of example only, with reference to the accompanying figures in which:

FIG. 1 (prior art) illustrates a high level diagram of a dual site radio frequency ("RF") communication system;

FIG. 2 (prior art) illustrates a typical frame and slot structure where a control channel is asynchronous with a time division multiple access ("TDMA") working channel;

FIG. 3 (prior art) illustrates a typical frame and slot structure where the control channel is asynchronous with a frequency division multiple access ("FDMA") working channel;

DETAILED DESCRIPTION OF THE PREFERRED EMBODIMENT

Figure 4:
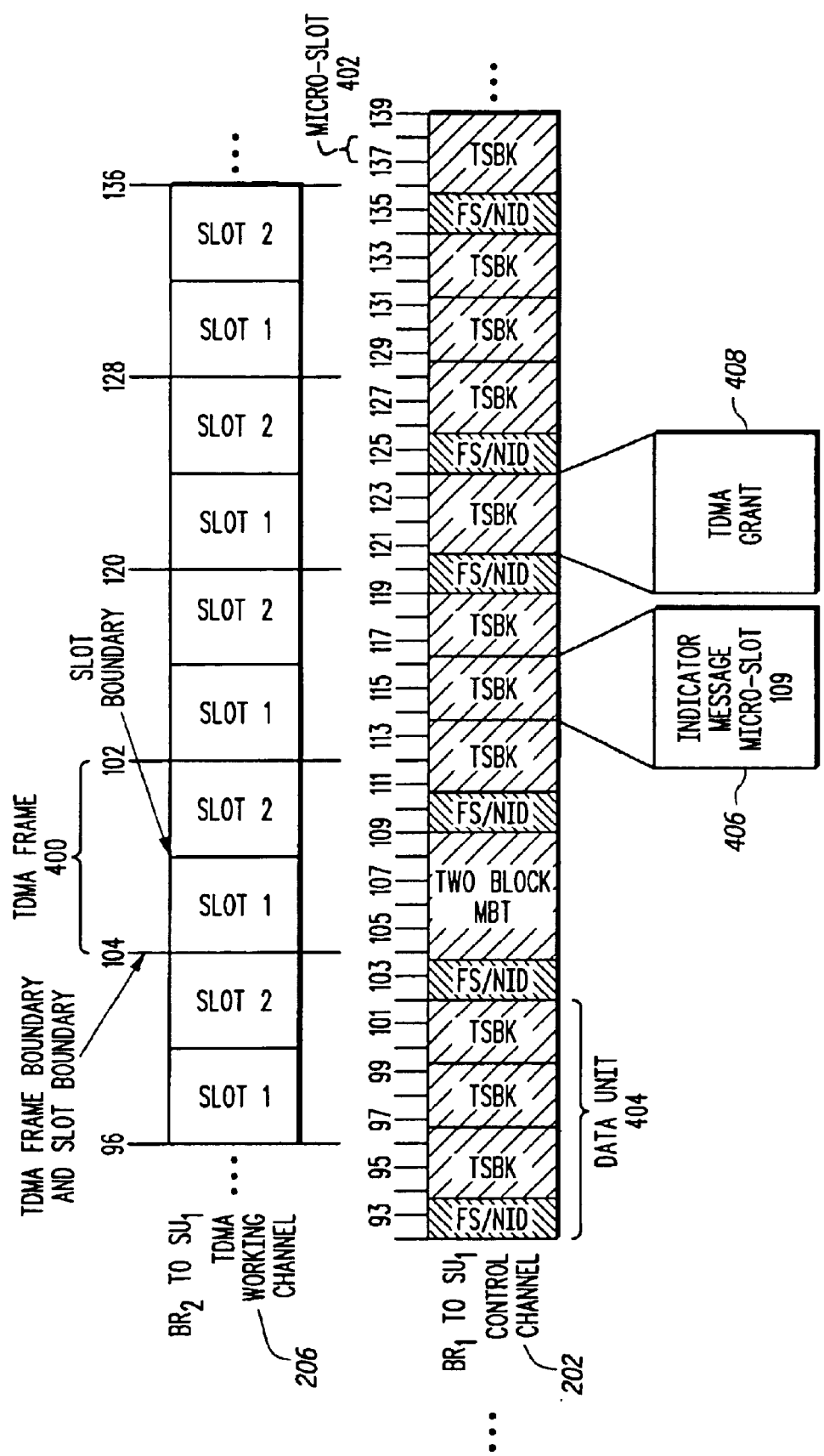
FIG. 4 illustrates a structure where TDMA frames of a TDMA working channel are synchronized with micro-slots of the control channel in accordance with the present invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention provides a method that allows a control channel 202 to provide timing synchronization and/or air interface encryption synchronization with a working channel 206/300. The present invention periodically broadcasts an indicator message in the control channel 202 to enable synchronization between the control channel 202 and a working channel 206/300 at a site 102, and optionally with at least one other channel at a different site 108. The indicator message in the present invention allows the subscriber unit 104 to discern the location of the TDMA frame boundaries and/or the value of micro-slots on the working channel. Let us now refer to the figures that illustrate the present invention in detail.

FIG. 4 illustrates a plurality of TDMA frames 400 on the TDMA working channel 206 synchronized (aligned) with micro-slots 402 on the control channel 202 in accordance with the preferred embodiment of the present invention. The TDMA working channel 206 comprises a plurality of TDMA frames 400. Each TDMA frame 400 comprises n-slots. For ease of explanation, the number of slots in the TDMA frame 400 is fixed throughout the TDMA working channel 206. The TDMA working channel 206 carries at least voice and/or data.

The control channel 202 comprises a plurality of data units 404, which may be of varying length and/or various information types, such as control, data, and/or voice (i.e., the control channel 202 may be a composite channel). A data unit 404 may comprise at least one independent packet. The control channel 202 also comprises a plurality of micro-slots 402. The data units 404 are integer elements of the micro-slots 402. In the present invention, each micro-slot 402 is numbered theoretically, preferably consecutively, for the duration of the control channel 202; in the preferred embodiment, the micro-slots 402 are numbered from 1–8000, wherein there are 8000 micro-slots per minute (however, any numbering scheme can be used and still remain within the spirit and scope of the present invention). For ease of explanation, the present invention assumes that micro-slot 1 always aligns (synchronizes) to a TDMA frame boundary; in other words, the control channel 202 and the TDMA working channel 206 make use of a common time base. Further, in the preferred embodiment, the subscriber unit 104 and the base radios 106 have a priori knowledge of the numbering scheme of the micro-slots 402.

FIG. 4 further illustrates an indicator message 406 that is periodically broadcasted on the control channel 202; the indicator message 406 indicates the micro-slot value 402 of the beginning or ending of the current data unit 404. Alternatively, the indicator message 406 represents a delta micro-slot value to the next TDMA frame boundary.

In the preferred embodiment, the indicator message 406 indicates the current GPS/atomic time in a month/day/year/hours/minutes/micro-slot format; other formats or type of information, however, may be used in the present invention. Any channel type can broadcast the indicator message 406: a dedicated control channel via a trunked signaling block ("TSBK") data unit, a composite channel via TSBK or link control ("LC") data units, a voice channel via TSBK or LC data units, and/or a packet data channel via TSBK or LC data units. With respect to the composite channel and the voice channel, the LC data unit may be one of a terminator link control or an embedded link control. It is important to note the data units 404 may be any integer number of micro-slots 402.

Figure 5:
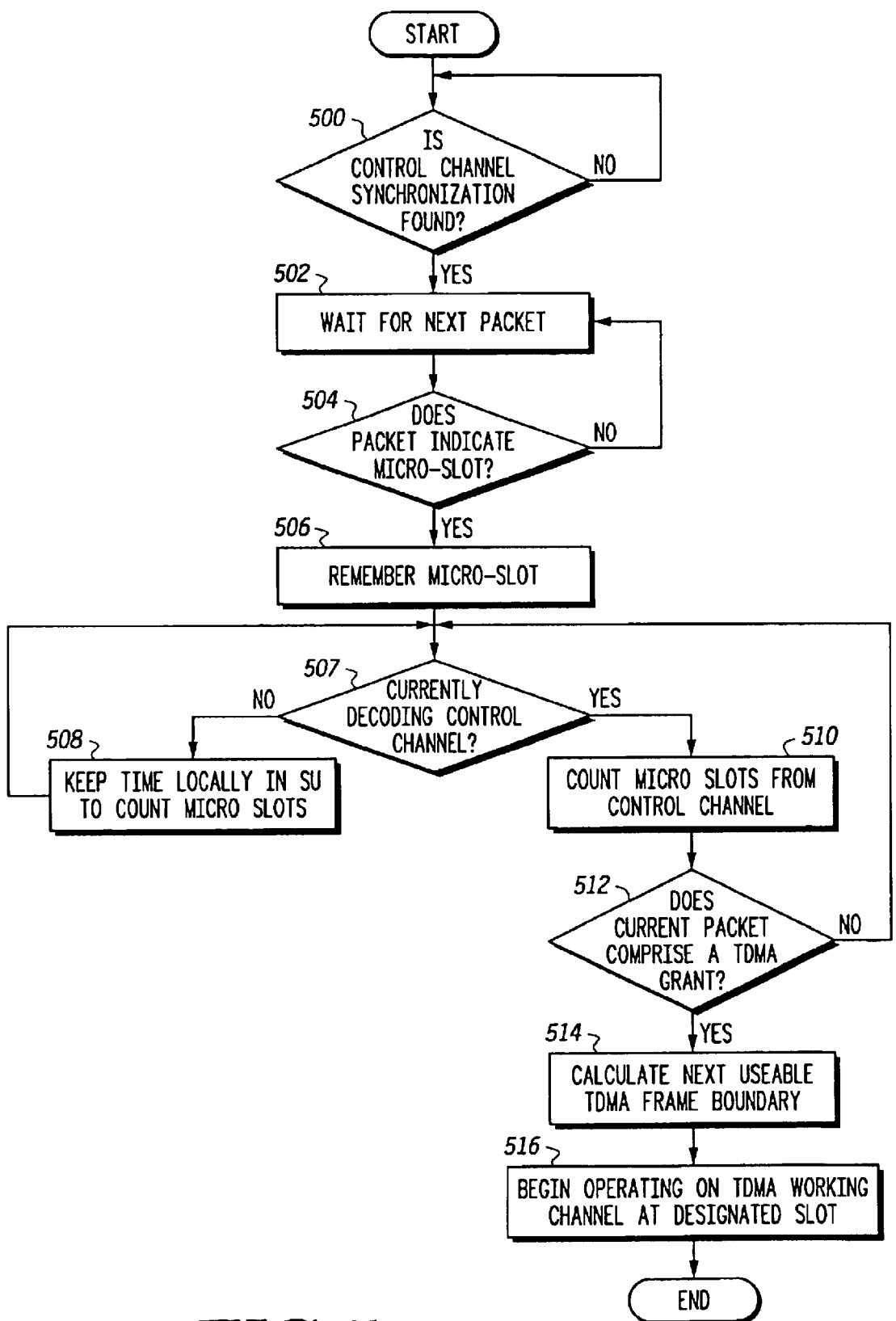
FIG. 5 illustrates a flowchart of subscriber operation to determine the boundaries of the TDMA working channel of FIG. 4 in accordance with the present invention.

Let us now turn the discussion to an example of the present invention as illustrated in FIGS. 4 and 5. As noted above, the present invention assumes that micro-slot 1 always aligns to a TDMA frame boundary; in this example, the inherent timing tick of a 60 ms TDMA frame 400 is matched with the inherent ticks of a 7.5 ms data unit 404. Further, the subscriber unit 104 and the base radios 106 have a priori knowledge of the numbering scheme of the micro-slots 402. It is also assumed that the subscriber unit 104 and the base radios 106 are operating properly, and that the subscriber unit 104 is registered at the site 102. In this example, at a first site 102, base radio two $106_2$ aligns a TDMA working channel 206 to micro-slot 96 of an existing control channel 202 being transmitted by base radio one $106_1$. Once aligned, base radio two $106_2$ begins to transmit TDMA frames 400.

An unsynchronized subscriber unit 104 tunes to the control channel 202 and begins looking for frame synchronization (at step 500). Upon finding synchronization, the subscriber unit 104 begins decoding data units 400 and interpreting the information in the at least one packet (at step 502). Once interpreted, the subscriber unit 104 determines if the packet comprises the indicator message 406 (at step 504). If the subscriber unit 104 determines that the packet does not comprise the indicator message 406, the subscriber unit 104 waits to receive subsequent packets (at step 502). If the subscriber unit 104, however, determines that the packet does comprise the indicator message 406, the subscriber unit 104 extracts the indicated micro-slot number from the indicator message 406 and stores the indicated micro-slot number into memory (at step 506). In this example, the micro-slot number in the indicator message 406 indicates the beginning of the current data unit 404. From the indicated micro-slot number, and from the a priori knowledge of the numbering scheme of the micro-slots 402, the subscriber unit 104 calculates TDMA frame boundaries, and their respective slot boundaries. Once the TDMA frame boundaries and their respective slot boundaries are calculated, the subscriber unit 104 learns the synchronization of the micro-slots on the control channel 202 to the TDMA frame boundaries on the TDMA working channel 206.

Once the synchronization between the control channel 202 and the TDMA working channel 206 is learned, the subscriber unit 104 attempts to decode subsequent packets (at step 508). If the subscriber unit 104 is unable to decode subsequent packets, the subscriber unit 104 executes an internal timer (not shown) to count in 7.5 ms increments in order to keep track of the synchronization between the control channel 202 and the TDMA working channel 206 (at step 510). The subscriber unit 104 continues to execute the internal timer until the subscriber unit 104 is able to resume decoding packets on the control channel 202.

Once the subscriber unit 104 resumes decoding subsequent packets on the control channel 202, the subscriber unit 104 counts micro-slots 402 from the control channel 202 in order to keep track of the synchronization between the control channel 202 and the TDMA working channel 206 (at step 512). The subscriber unit continues to count micro-slots from the control channel 202 until the packet being decoded comprises a TDMA grant 408 granting the subscriber unit 104 permission to transmit on slot one of the TDMA working channel 206 (at step 514). Once a TDMA grant 408 is received, the subscriber unit 104 calculates the next usable TDMA frame 400 from its knowledge of the TDMA frame boundaries, which in this example is micro-slot 128 (at step 516), and begins operating on the TDMA working channel 206 at the designated slot, which in this example, is also micro-slot 128 (at step 518). The subscriber unit 104 continues to keep track of the synchronization between the micro-slots 402 and the TDMA frame boundaries and transmits information on slot one of subsequent TDMA frames 400 until all information is transmitted.

Thus, the present invention allows the subscriber unit 104 who has learned TDMA frame/slot synchronization from the control channel 202 and received permission to transmit on a designated transmit slot from the base radio 106 to go directly from the receiving information on the control channel 202 to transmitting/receiving information on the TDMA traffic channel. Thus, the only delay after tuning to the transmit frequency is waiting for the next transmit opportunity.

At this point, timing synchronization between a control channel 202 and a TDMA working channel 206 has been provided in such a manner to allow the subscriber unit to operate on the TDMA working channel 206 at the next usable TDMA frame boundary in accordance with the present invention. Let us now turn the discussion to air interface encryption synchronization between a control channel 202 and a FDMA working channel 300 in accordance with the present invention.

Figure 6:
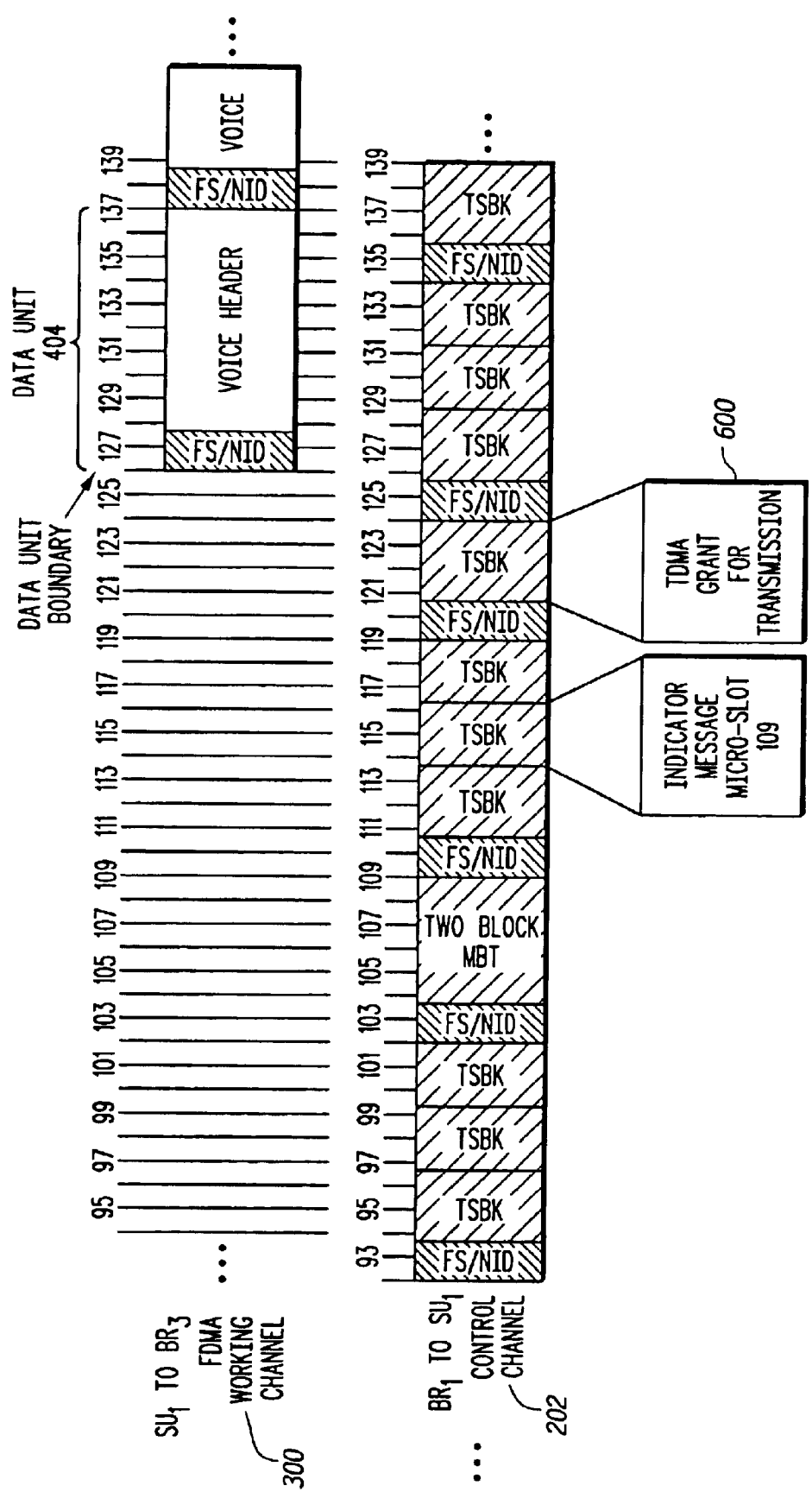
FIG. 6 illustrates a data unit structure of a control channel synchronized with an outbound FDMA working channel on micro-slot increments in accordance with the present invention.
Figure 7:
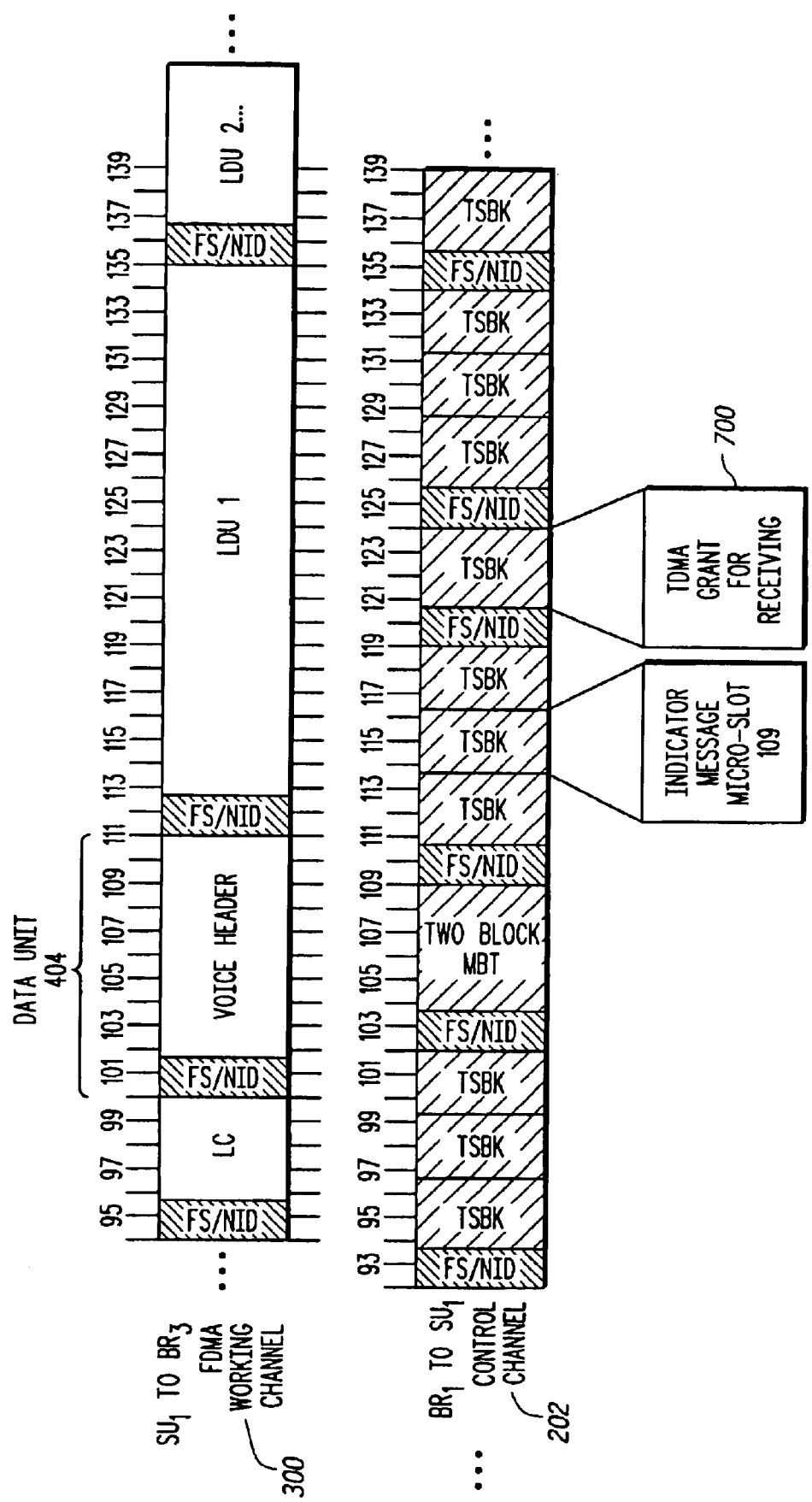
FIG. 7 illustrates a data unit structure of a control channel synchronized with an inbound FDMA working channel on micro-slot increments in accordance with the present invention.
Figure 8:
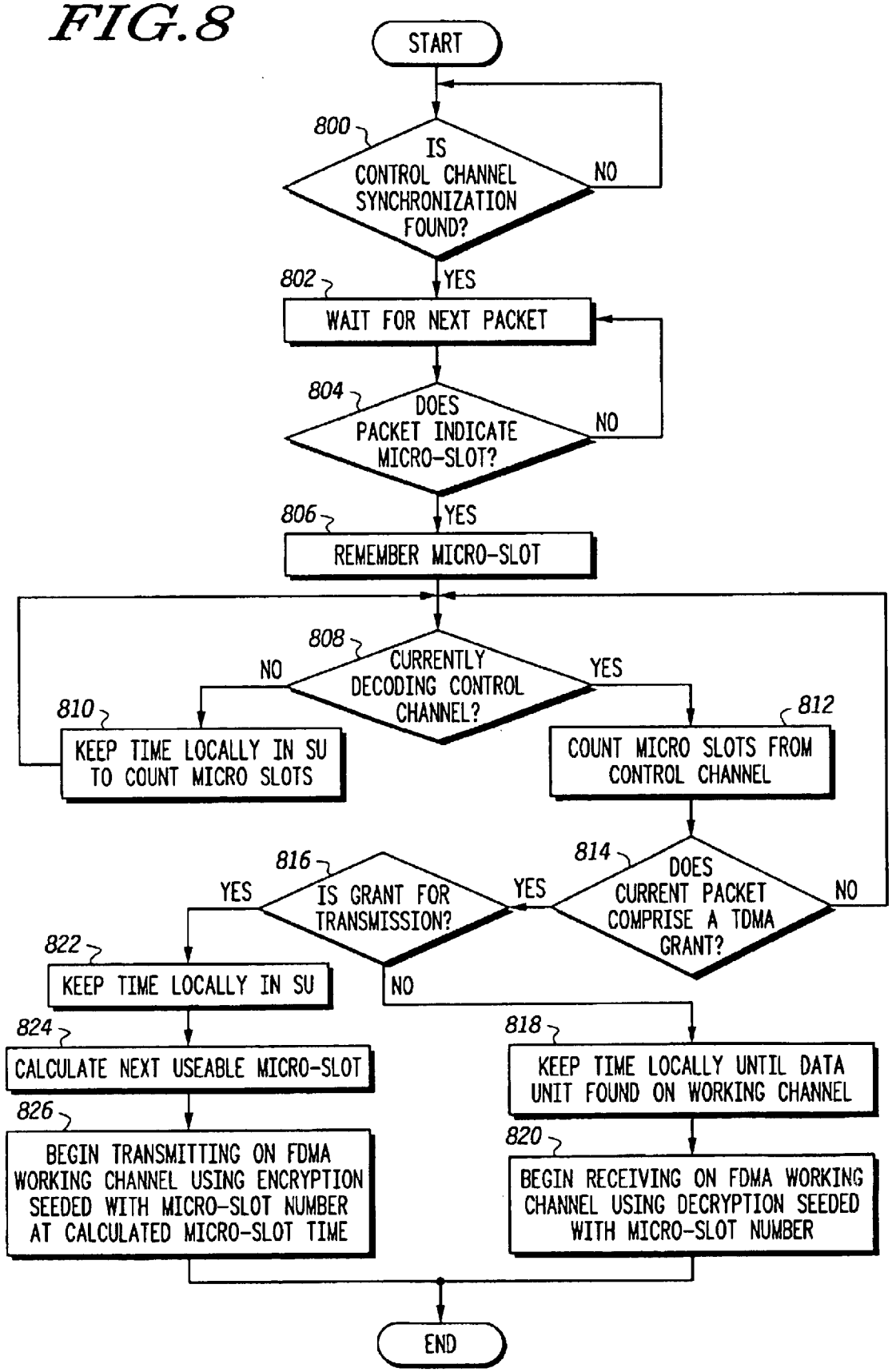
FIG. 8 illustrates a flowchart of subscriber operation of FIG. 6 and FIG. 7 in accordance with the present invention.

FIGS. 6 and 7 illustrate a data unit structure of a control channel 202 synchronized with a FDMA working channel 300 on micro-slot increments 402 in accordance with the present invention. In particular, FIG. 6 illustrates an inbound FDMA working channel 300, and FIG. 7 illustrates an outbound FDMA working channel 300. For the sake of brevity, the characteristics of the FDMA working channel 300 is substantially similar to the characteristics of the control channel 202 as described above with respect to FIG. 4. As such, let us turn directly to an example of the air interface encryption synchronization in accordance with the present invention as illustrated in FIGS. 6–8. As above in the previous example, it is assumed that the subscriber unit 104 and the base radios 106 are operating properly, and that the subscriber unit 104 is registered at site one 102. In this example, at site one 102, base radio three 106$_3$ synchronizes a FDMA working channel 300 to micro-slot 94 of an existing control channel 202 being transmitted by base radio one 106$_1$. Once aligned, base radio three 106$_3$ begins to transmit FDMA data units 404.

As in FIG. 5, an unsynchronized subscriber unit 104 tunes to the control channel 202 and begins looking for frame synchronization (at step 800). Upon finding synchronization, the subscriber unit 104 begins decoding data units and interpreting the information in the at least one packet (at step 802). Once interpreted, the subscriber unit 104 determines if the packet comprises the indicator message 406 to indicate the beginning of the current data unit (at step 804). If the subscriber unit 104 determines that the packet does not comprise the indicator message 406, the subscriber unit 104 waits to receive subsequent packets (at step 802). If the subscriber unit 104, however, determines that the packet does comprise the indicator message 406, the subscriber unit 104 extracts the indicated micro-slot number from the indicator message 406 and stores the indicated micro-slot number into memory (at step 806). Again, in this example, the micro-slot number indicates the beginning of the current data unit 404. The subscriber unit 104 learns the synchronization of the control channel 202 with the FDMA working channel 300 as the subscriber unit 104 knows the micro-slot number and the point in time to which the micro-slot number 402 refers.

Once the synchronization between the control channel 202 and the FDMA working channel 300 is learned, the subscriber unit 104 attempts to decode subsequent packets on the control channel 202 (at step 808). If the subscriber unit 104 is unable to decode subsequent packets, the subscriber unit 104 executes an internal timer to count in 7.5 ms increments in order to keep tracking the synchronization between the control channel 202 and the FDMA working channel 300 (at step 810). The subscriber unit 104 continues to execute the internal timer until the subscriber unit 104 is able to resume decoding packets on the control channel 202.

Once the subscriber unit 104 is able to resume decoding subsequent packets on the control channel 202, the subscriber unit 104 counts micro-slots from the control channel 202 in order to keep tracking the synchronization between the control channel 202 and the FDMA working channel 300 (at step 812). The subscriber unit 104 continues to count micro-slots from the control channel 202 until the packet being decoded comprises a FDMA grant 600/700 (at step 816). If the FDMA grant 600/700 indicates that the subscriber unit 104 should begin reception on the FDMA working channel 300 (at step 816), the subscriber unit 104 stops counting micro-slots 402 from the control channel 202, and begins tracking time locally (at step 818). The subscriber unit 104 tunes to the FDMA working channel 300 until a data unit boundary is found on the working channel 300 (at step 818). Once a data unit boundary is found on the FDMA working channel 300, the subscriber unit 104 begins receiving information on the FDMA working channel 300 using the micro-slot number corresponding to the beginning of the data unit boundary as a seed for decrypting the information carried over the FDMA working channel 300 (at step 820). This process repeats until all the desired data units are received.

Alternatively, if the FDMA grant 600/700 indicates that the subscriber unit 104 should begin transmission on the FDMA working channel 300 (at step 816), the subscriber unit 104 stops counting micro-slots from the control channel 202, and begins tracking time locally until the subscriber unit 104 is able to transmit (at step 822). The subscriber unit 104 determines when it is able to transmit on the FDMA working channel 300 by calculating the next useable micro-slot 402 (which in this case is micro-slot 126) determined by various delays that are obvious to those skilled in the art, such as time needed to tune to the FDMA working channel 300, time needed to enable the transmitter, or the like (at step 824). Once the subscriber unit 104 identifies the next useable micro-slot 402, the subscriber unit 104 tunes to the FDMA working channel 300.

Upon reaching the identified useable micro-slot (i.e., micro-slot 126 in this example) in time, the subscriber unit 104 begins transmitting a data unit that is encrypted using the identified micro-slot 402 as the seed for the encryption (at step 826). This process repeats until all the desired data units 404 are transmitted.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. For example, the subscriber unit and/or the base radio may comprise a storage medium having stored thereon a set of instructions which, when loaded into a hardware device (e.g., a microprocessor), causes the hardware device to perform the following functions of the present invention. The present invention can be implemented in at least one of hardware, firmware and/or software. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

It should be noted that the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language).

I claim:

1. A method comprising the steps of:
   listening to a first channel of a RF communication system wherein the first channel comprises a plurality of micro-slots and a plurality of data units for an indicator message;
   decoding the indicator message on the first channel wherein the indicator message comprises a micro-slot value;
   learning a synchronization between the first channel and a second channel based on the micro-slot value;
   receiving an assignment on the first channel to operate on the second channel;
   calculating a boundary on the second channel from the micro-slot value; and
   operating on the second channel at the boundary.

2. The method of claim 1 wherein the micro-slot value identifies one of a beginning and an end of the current data unit.

3. The method of claim 1 wherein the first channel is a control channel, and the second channel is a working channel.

4. The method of claim 1 wherein the second channel is a time division multiple access working channel.

5. The method of claim 4 wherein the boundary is a slot boundary.

6. The method of claim 1 wherein the second channel is a frequency division multiple access working channel.

7. The method of claim 6 wherein the boundary is a micro-slot boundary.

8. The method of claim 1 further comprising the step of using the micro-slot value to keep time locally in order to track synchronization between the first channel and the second channel.

9. The method of claim 8 further comprising the steps of:
   terminating the step of listening to the first channel;
   listening to the second channel for a beginning of a next data unit upon the step of terminating;
   determining a micro-slot value associated with the beginning of the next data unit; and
   using the micro-slot value associated with the beginning of the next data unit to decrypt the next data unit.

10. The method of claim 8 further comprising the steps of:
    terminating the step of listening to the first channel;
    determining a subsequent micro-slot value to transmit a data unit on the second channel; and
    using the subsequent micro-slot value to encrypt the data unit on the second channel.

11. The method of claim 1 further comprising the step of counting at least one micro-slot from the first channel in order to track synchronization between the first channel and the second channel.

12. The method of claim 1 wherein the plurality of micro-slots have a numbering scheme, and further comprising the step of having a priori knowledge of the numbering scheme used for the plurality of micro-slots.

13. The method of claim 1 wherein the plurality of data units are of varying lengths.

14. A method comprising the steps of:
    transmitting a first plurality of data units on a first channel of a RF communication system, wherein the first channel comprises a fist plurality of micro-slots;
    transmitting a second plurality of data units on a second channel, wherein the second channel comprises a second plurality of micro-slots, and wherein the first plurality of micro-slots are synchronized with the second plurality of micro-slots; and
    transmitting an indicator message on the first channel in at least one of the plurality of data units, wherein the indicator message comprises at least a micro-slot value used to associate the synchronization between the first channel and the second channel.

15. The method of claim 14 further comprising the steps of:
    receiving an encrypted data unit on the second channel at a given micro-slot value; and
    decrypting the data unit using the given micro-slot value.

16. The method of claim 14 further comprising the steps of:
    transmitting an encrypted data unit on the second channel at a given micro-slot value, wherein the data unit is encrypted using the given micro-slot value.

17. The method of claim 14 wherein the plurality of data units are or varying lengths.

18. A method comprising the steps of:
    transmitting a plurality of data units on a first channel of a RF communication system, wherein the first channel comprises a plurality of micro-slots;
    transmitting a plurality of time division multiple access ("TDMA") frames on a second channel, wherein the second channel comprises a plurality of frame boundaries, and wherein the plurality of frame boundaries are synchronized with the plurality of micro-slots; and
    transmitting an indicator message on the first channel in at least one of the plurality of data units, wherein the indicator message comprises at least a micro-slot value used to associate the synchronization between the first channel and the second channel.

19. The method of claim 18 wherein the each frame boundary comprises at least one slot boundary, and further comprising the steps of:
    receiving an encrypted data unit on the second channel at a given slot boundary; and
    decrypting the data unit using the given slot boundary.

20. The method of claim 18 wherein the each frame boundary comprises at least one slot boundary, and further comprising the steps of:
    transmitting an encrypted data unit on the second channel at a given slot boundary, wherein the data unit is encrypted using the given slot boundary.

21. The method of claim 18 wherein the plurality of data units are of varying lengths.

* * * * *

UNITED STATES PATENT AND TRADEMARK OFFICE
CERTIFICATE OF CORRECTION

PATENT NO. : 6,882,663 B2
DATED : April 19, 2005
INVENTOR(S) : Biggs et al.

It is certified that error appears in the above-identified patent and that said Letters Patent is hereby corrected as shown below:

<u>Column 8,</u>
Line 36, change "or" to -- of --

Signed and Sealed this

Twelfth Day of July, 2005

JON W. DUDAS
*Director of the United States Patent and Trademark Office*